United States Patent
Hill et al.

(10) Patent No.: US 10,976,249 B1
(45) Date of Patent: Apr. 13, 2021

(54) REFLECTIVE PUPIL RELAY SYSTEM

(71) Applicant: KLA-Tencor Corporation, Milpitas, CA (US)

(72) Inventors: Andrew Hill, Berkeley, CA (US); Gregory Brady, Campbell, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 632 days.

(21) Appl. No.: 14/504,234

(22) Filed: Oct. 1, 2014

Related U.S. Application Data

(60) Provisional application No. 61/992,167, filed on May 12, 2014.

(51) Int. Cl.
*G01N 21/47* (2006.01)
*G02B 19/00* (2006.01)

(52) U.S. Cl.
CPC ......... *G01N 21/47* (2013.01); *G02B 19/0023* (2013.01); *G02B 19/0076* (2013.01); *G01N 2201/068* (2013.01)

(58) Field of Classification Search
CPC ............. G01N 21/47; G01N 2201/068; G02B 19/0023; G02B 19/0076
USPC ........................................................ 359/434
See application file for complete search history.

(56) References Cited

U.S. PATENT DOCUMENTS

| | | | |
|---|---|---|---|
| 4,156,852 A * | 5/1979 | Hagen | H01S 3/2333 359/337 |
| 5,608,526 A | 3/1997 | Piwonka-Corle et al. | |
| 5,737,137 A | 4/1998 | Cohen et al. | |
| 5,859,424 A | 1/1999 | Norton et al. | |
| 6,429,943 B1 | 8/2002 | Opsal et al. | |
| 7,079,321 B2 | 7/2006 | Coston et al. | |
| 7,253,376 B2 | 8/2007 | Zhang et al. | |
| 7,478,019 B2 | 1/2009 | Zangooie et al. | |
| 7,518,789 B2 | 4/2009 | Shafer et al. | |
| 7,869,122 B2 | 1/2011 | Shafer et al. | |
| 7,933,026 B2 | 4/2011 | Opsal et al. | |
| 7,947,968 B1 | 5/2011 | Markle et al. | |
| 8,634,064 B2 | 1/2014 | Smirnov | |
| 9,915,522 B1 | 3/2018 | Jiang et al. | |
| 2013/0155399 A9 | 6/2013 | Hwang et al. | |

(Continued)

*Primary Examiner* — Marin Pichler
*Assistant Examiner* — Mitchell T Oestreich
(74) *Attorney, Agent, or Firm* — Joseph S. Spano; Spano Law Group

(57) ABSTRACT

Methods and systems for relaying an optical image using a cascade arrangement of tilted, concave mirrors are presented. An exemplary optical relay system includes a cascade arrangement of four mirrors each having concave, spherical surface figures. The first and third mirrors are configured to focus collimated wavefronts and the second and fourth mirrors re-collimate diverging wavefronts reflected from the first and third mirrors. Each mirror is tilted such that wavefronts located in the local field plane and local pupil plane of each mirror are physically separated. The magnitude and direction of each tilt angle are arranged such that off-axis aberrations introduced by each individual mirrors are largely compensated by the other mirrors. Such an optical relay system is employed to relay images of the pupil plane of a metrology system that is configured to perform accurate measurements of semiconductor structures and materials over a broad range of illumination wavelengths.

23 Claims, 12 Drawing Sheets

(56) References Cited

U.S. PATENT DOCUMENTS

2014/0111791 A1   4/2014   Manassen et al.
2014/0172394 A1   6/2014   Kuznetsov et al.
2014/0222380 A1   8/2014   Kuznetsov et al.

* cited by examiner

REFLECTIVE PUPIL RELAY SYSTEM

CROSS REFERENCE TO RELATED APPLICATION

The present application for patent claims priority under 35 U.S.C. § 119 from U.S. provisional patent application Ser. No. 61/992,167, entitled "Reflective Pupil Relay System," filed May 12, 2014, the subject matter of which is incorporated herein by reference in its entirety.

TECHNICAL FIELD

The described embodiments relate to metrology systems and methods, and more particularly to methods and systems for improved measurement accuracy.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. A number of metrology based techniques including scatterometry and reflectometry implementations and associated analysis algorithms are commonly used to characterize critical dimensions, film thicknesses, composition and other parameters of nanoscale structures.

In some examples, overlay and critical dimension (CD) metrology is performed by illuminating grating targets and measuring the angular distribution of light returned from the grating. The angular distribution maps to a spatial distribution in the pupil plane of an objective lens. The light distribution in the pupil plane of the objective lens is typically imaged onto a 2-dimensional pixelated sensor such as a charge coupled device (CCD) array by a pupil relay system. Collecting the angular distribution of light from the grating target at multiple discrete wavelengths or over a broad spectrum of illumination can provide additional accuracy and flexibility to the measurement of the target parameters.

In some examples, a pupil relay system includes refractive lens elements having spherical surface figures positioned symmetrically on the optical axis. Refractive lens elements are fabricated from dispersive optical materials. The dependence of refractive index on wavelength introduces chromatic aberrations. As a result, a well-corrected image may only be produced over a limited spectral bandwidth. In addition, many optical materials are strongly absorptive at wavelengths that are of particular interest to scatterometry (e.g., wavelengths near or below 200 nanometers). Most optical glasses do not transmit in the UV spectrum and below. In the deep-UV and vacuum-UV spectrums, viable transmissive materials are even more limited and expensive. This limits transmission efficiency and also limits the ability to correct chromatic aberrations.

In addition, significant optical design and manufacturing expense are incurred to mitigate the effect of ghost images that arise when refractive optics are used to form a pupil relay. Ghost images are undesired field or pupil images formed by multiple reflections from the spherical refractive surfaces of the relay optics. Ghost reflections are typically mitigated in two ways. In one approach, the location of the images formed by many combinations of multiple reflections is found and the optical design is tuned to ensure that these locations are all far from the detector plane. However, in practice, it is often impossible to be certain that no ghost reflections fall on the detector plane. In the second approach, high quality antireflection coatings are applied to all surfaces in the optical path to ensure that significantly less power is present in the ghost image than in the main image. Unfortunately, for broadband systems it is often difficult to design and fabricate a suitable antireflection coating.

In some other examples, a pupil relay system includes reflective elements with spherical surface figures positioned symmetrically on the optical axis.

Unfortunately, reflective elements symmetrically positioned on an optical axis require holes, obscurations, or a combination of holes and obscurations in the optical elements to allow light to propagate through the relay system. These holes and obscurations in the light path block potentially useful information and diffract light at their edges, thus risking contamination of the un-obscured regions of the pupil.

In some other examples, a pupil relay system includes reflective elements with aspheric surface figures positioned asymmetrically about the optical axis. Reflective elements can be positioned asymmetrically about the optical axis to avoid introducing obscurations in the light path. However, off-axis elements typically require aspheric surface shapes (e.g., off-axis parabolas or off-axis ellipses) to correct for aberrations introduced by their off-axis positioning. Aspheric surface shapes are more expensive to produce than spherical shapes and are more difficult to produce with the low levels of irregularity that are required to generate a well-corrected image. In particular, the processes used to generate aspheric surfaces tend to yield mid-spatial frequency irregularities in the surface figure that are particularly problematic in an angular resolved scatterometer. In an angularly resolved scatterometer, high-spatial frequency irregularity (i.e., roughness) can largely be blocked by field stops, and low-spatial frequency irregularity mainly causes an increase in the central lobe of the illumination spot. However, mid-spatial frequencies tend to increase the size of the spot tails which are then truncated and diffracted by the field stops. This diffraction can contaminate the pupil image and lead to measurement inaccuracies. Further, it is frequently difficult to produce well-corrected images using a simple system of aspherical mirrors with relatively large fields (usually required in a pupil relay) or at multiple conjugates (e.g., field plane and pupil plane imaging needed in a practical scatterometer).

In some examples, field and pupil images are located on or close to optical surfaces. This gives rise to increased sensitivity to imperfections and particulates on the optical surfaces. For example, in an angular-resolved scatterometer, light is focused to a small spot in the field plane. Any imperfection on a surface located near a field plane scatters a significant portion of the focused energy and contaminates the pupil images. Moreover, imperfections on a surface near a pupil plane are imaged at high contrast onto the measurement sensor where they contaminate a local region of the pupil. In some reflective pupil relay systems (e.g., an Offner configuration), a field plane is located directly on a mirror surface. This configuration is extremely sensitive to imperfections on the mirror surface.

Future metrology applications present challenges due to increasingly small resolution requirements, multi-parameter correlation, increasingly complex geometric structures, and increasing use of opaque materials. Thus, methods and systems for improved optical image relay over a broad wavelength range are desired.

SUMMARY

Methods and systems for relaying an optical image using a system of tilted, concave mirrors are presented. The use of reflective optics minimizes optical dispersion, thus the level of image correction achieved by the pupil relay system is identical at all wavelengths. In addition, the use of reflective optics eliminates ghost reflections induced by conventional refractive optical elements.

In one aspect, an optical relay system includes a cascade arrangement of four mirrors each having concave surface figures. The first and third mirrors of the cascade arrangement are configured to focus collimated wavefronts and the second and fourth mirrors re-collimate diverging wavefronts reflected from the first and third mirrors. Each mirror is tilted such that wavefronts located in the local field plane and wavefronts located in the local pupil plane of each mirror are physically separated. In this manner, light propagates between the mirrors without obscuration or truncation. Furthermore, the tilt axis of the first mirror of the cascade arrangement is orthogonal to the tilt axis of the third mirror of the cascade arrangement.

In general, the magnitude and direction of each tilt angle associated with each mirror are arranged such that off-axis aberrations introduced by the individual mirrors are largely compensated by the other mirrors. In one embodiment, the tilt axis of the second mirror is orthogonal to the tilt axis of the first mirror, and the tilt axis of the fourth mirror is orthogonal to the tilt axis of the third mirror. In another embodiment, the tilt axis of the second mirror is parallel to the tilt axis of the first mirror, and the tilt axis of the fourth mirror is parallel to the tilt axis of the third mirror.

In another aspect, all local pupil and field planes are located one focal length away from each corresponding mirror surface. Thus, the sensitivity of the system to imperfections on the mirror surfaces is minimized. In some embodiments, each mirror has a concave, spherical surface figure. Spherical surfaces can be readily manufactured to high precision and surface finish, thus further minimizing errors introduced due to mirror surface imperfections.

In some embodiments, the focal length of each mirror is the same, and the radius of curvature and tilt angles of all four mirrors in the pupil relay system are the same nominal values. This forms an afocal pupil relay system having 1× magnification.

In some other embodiments, an afocal pupil relay system having a magnification other than 1× magnification can be formed by assembling mirrors having one or more different focal lengths in a cascade arrangement as described herein.

In another aspect, the optical relay systems presented herein are employed to relay images of the pupil plane of a metrology system configured to perform accurate measurements of semiconductor structures and materials over a broad range of illumination wavelengths. Such metrology systems are employed to measure structural and material characteristics (e.g., material composition, dimensional characteristics of structures and films, etc.) associated with different semiconductor fabrication processes.

In some embodiments, an angle resolved scatterometer includes an optical relay system as described herein. In these embodiments, the object is the pupil plane of an objective lens. Thus, the system of tilted, concave mirrors functions as a pupil imaging or pupil relay system. The system of tilted, concave mirrors produces well-corrected and unobstructed images of the objective pupil and well-corrected field images (typically at infinite object and infinite image conjugates).

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Figure 1:
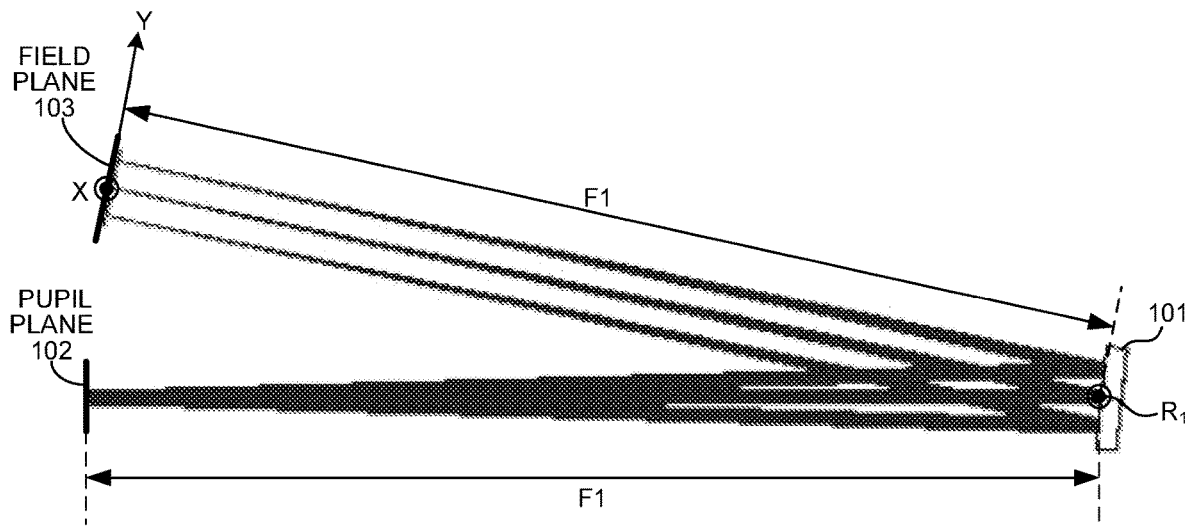
FIG. 1 is a diagram illustrative of a tilted, concave, spherical mirror and its associated pupil plane and field plane 103.

Reference will now be made in detail to background examples and some embodiments of the invention, examples of which are illustrated in the accompanying drawings.

Methods and systems for relaying an optical image using a system of tilted, concave mirrors, which together, form a well-corrected image of an object are presented. In some embodiments, the optical relay systems presented herein are employed to relay images of the pupil plane of a metrology system configured to perform accurate measurements of semiconductor structures and materials over a broad range of illumination wavelengths. Such metrology systems are employed to measure structural and material characteristics (e.g., material composition, dimensional characteristics of structures and films, etc.) associated with different semiconductor fabrication processes.

In some embodiments, an angle resolved scatterometer includes an optical relay system as described herein. In these embodiments, the object is the pupil plane of an objective lens. Thus, the system of tilted, concave mirrors functions as a pupil imaging or pupil relay system. The system of tilted, concave mirrors produces well-corrected and unobstructed images of the objective pupil and well-corrected field images (typically at infinite object and infinite image conjugates). The use of mirror elements ensures that the optical relay system images over a broad spectral range with minimal chromatic aberration. In addition, the use of spherical mirror shapes ensures that the shape and finish of each mirror element can be manufactured to a high degree of precision and surface quality. This minimizes disruptions in the illumination and collection wavefronts introduced by manufacturing artifacts such as surface roughness and irregularities.

In one aspect, an optical relay system includes a cascade arrangement of four mirrors each having concave surface figures. The first and third mirrors of the cascade arrangement are configured to focus collimated wavefronts and the second and fourth mirrors re-collimate diverging wavefronts reflected from the first and third mirrors. Each mirror is tilted by a tilt angle about a tilt axis fixed to each mirror such that wavefronts located in the local field plane and wavefronts located in the local pupil plane of each mirror are physically separated. By simple geometry, the tilt angle is the angle between a vector normal to the local pupil plane and a vector normal to the local field plane associated with each mirror. Thus, the tilt angle is the angle that physically separates the local field plane and the local pupil plane associated with each mirror (e.g., the angle between the incoming and outgoing beams). Also, by simple geometry, the tilt axis is a vector parallel to both the local pupil plane and the local field plane associated with each mirror. Thus, the tilt axis is the axis about which the optic is rotated to achieve the tilt angle (e.g., an axis perpendicular to a plane formed by the incoming and outgoing beams). In this manner, light propagates between the mirrors without obscuration or truncation. At a zero tilt angle, the incoming and outgoing beams are aligned with the optical axis of the mirror resulting in obscuration or truncation. Furthermore, the tilt axis of the first mirror of the cascade arrangement is orthogonal to the tilt axis of the third mirror of the cascade arrangement. In general, the magnitude and direction of each tilt angle associated with each mirror are arranged such that off-axis aberrations introduced by the individual mirrors are largely compensated by the other mirrors.

The use of reflective optics minimizes optical dispersion, thus the level of image correction achieved by the pupil relay system is identical at all wavelengths. The spectral bandwidth over which the system can be utilized is limited only by the performance of the reflective mirror coatings. Existing mirror coating systems reflect light in the deep-UV, vacuum-UV, and even shorter spectrums. In addition, the use of reflective optics eliminates ghost reflections induced by conventional refractive optical elements.

In some embodiments, each mirror has a concave, spherical surface figure. Spherical surfaces can be readily manufactured to high precision and surface finish.

In another aspect, all local pupil and field planes are located one focal length away from each corresponding mirror surface. Thus, the sensitivity of the system to imperfections on the mirror surfaces is minimized. Each mirror is utilized in an "F-F" configuration, such that the local field and pupil planes are each located one focal length from the mirror. Wavefronts in the local pupil of each mirror are collimated and wavefronts in the local field planes of each mirror are telecentric. Each mirror is tilted with respect to the incoming beam by a tilt angle about a tilt axis fixed to the mirror so that its local pupil and field planes are physically separated. In the cascade arrangement, the field plane of the first mirror is aligned with the field plane of the second mirror, the pupil plane of the second mirror is aligned with the pupil plane of the third mirror, and the field plane of the third mirror is aligned with the field plane of the fourth mirror.

FIG. 1 illustrates a concave, spherical mirror 101 and its associated pupil plane 102 and field plane 103. As depicted in FIG. 1, the pupil plane 102 and the field plane 103 are each located one focal length (F1) from mirror 101. Wavefronts in the pupil plane 102 of mirror 101 are collimated and wavefronts in the field plane 103 of mirror 101 are telecentric. Mirror 101 is tilted about a tilt axis, R1, so that its local pupil and field planes are physically separated. In this manner, wavefronts propagating through pupil plane 102 and field plane 103 do not interfere.

Figure 2A:
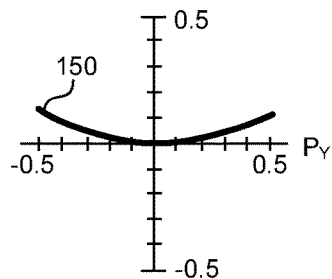
FIGS. 2A-2B depict wavefront aberrations induced by the single mirror of FIG. 1 at the center of the image field in two orthogonal directions.
Figure 2B:
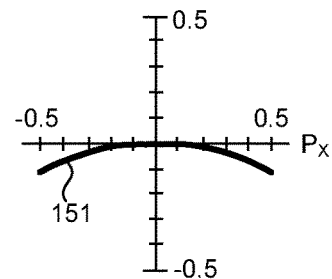
Figure 3A:
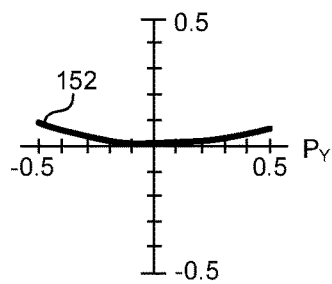
FIGS. 3A-3B depict wavefront aberrations induced by the single mirror of FIG. 1 at a corner of the image field in two orthogonal directions.
Figure 3B:
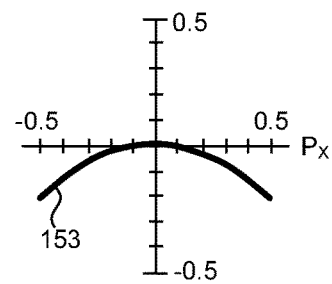
Figure 4A:
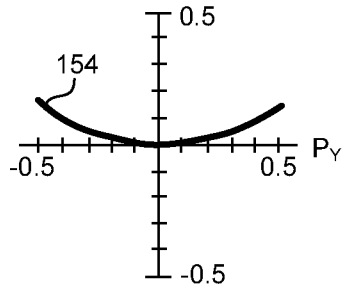
FIGS. 4A-4B depict wavefront aberrations induced by the single mirror of FIG. 1 at another corner of the image field in two orthogonal directions.
Figure 4B:
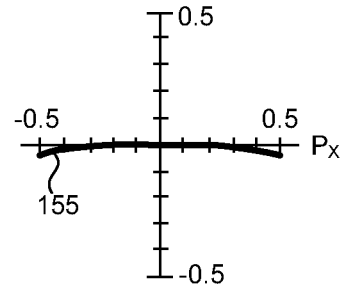
Figure 5A:
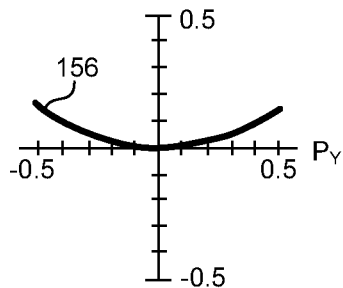
FIGS. 5A-5B depict wavefront aberrations induced by the single mirror of FIG. 1 at yet another corner of the image field in two orthogonal directions.
Figure 5B:
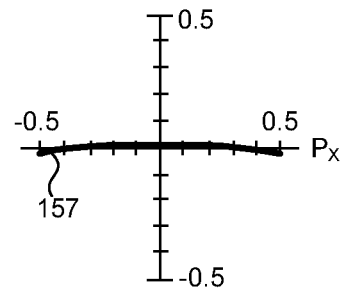
Figure 6A:
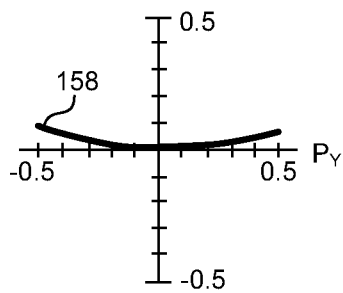
FIGS. 6A-6B depict wavefront aberrations induced by the single mirror of FIG. 1 at yet another corner of the image field in two orthogonal directions.
Figure 6B:
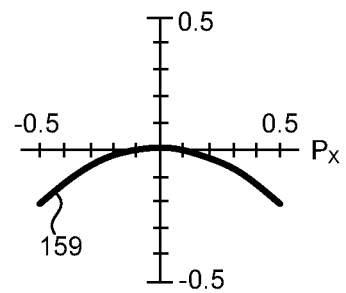

FIGS. 2A-6B depict wavefront aberrations induced by the single mirror 101 at five different field locations (e.g., five locations in field plane 103). FIG. 2A depicts the optical path difference 150 from the pupil plane 102 to the field plane 103 at a range of displacements in the y-direction (i.e., $P_Y$) from the center of the image field (i.e., {X,Y}={0.0,0.0} located in field plane 103. FIG. 2B depicts the optical path difference 151 from the pupil plane 102 to the field plane 103 at a range of displacements in the x-direction (i.e., $P_X$) from the center of the image field (i.e., {X,Y}={0.0,0.0} located in field plane 103. FIGS. 3A-3B depict the optical path differences 152 and 153 from the pupil plane 102 to the field plane 103 at a range of displacements in the y-direction and the x-direction, respectively, from a corner of the image field (i.e., {X,Y}={0.050,−0.050} located in field plane 103. FIGS. 4A-4B depict the optical path differences 154 and 155 from the pupil plane 102 to the field plane 103 at a range of displacements in the y-direction and the x-direction, respectively, from another corner of the image field (i.e., {X,Y}={−0.050,0.050} located in field plane 103. FIGS. 5A-5B depict the optical path differences 156 and 157 from the pupil plane 102 to the field plane 103 at a range of displacements in the y-direction and the x-direction, respectively, from yet another corner of the image field (i.e., {X,Y}={0.050,0.050} located in field plane 103. FIGS. 6A-6B depict the optical path differences 158 and 159 from the pupil plane 102 to the field plane 103 at a range of displacements in the y-direction and the x-direction, respectively, from yet another corner of the image field (i.e., {X,Y}={−0.050,−0.050} located in field plane 103.

As depicted in FIGS. 2-6, the single concave spherical mirror 101 forms an image at relatively low aperture with astigmatism as the dominant aberration.

Figure 7:
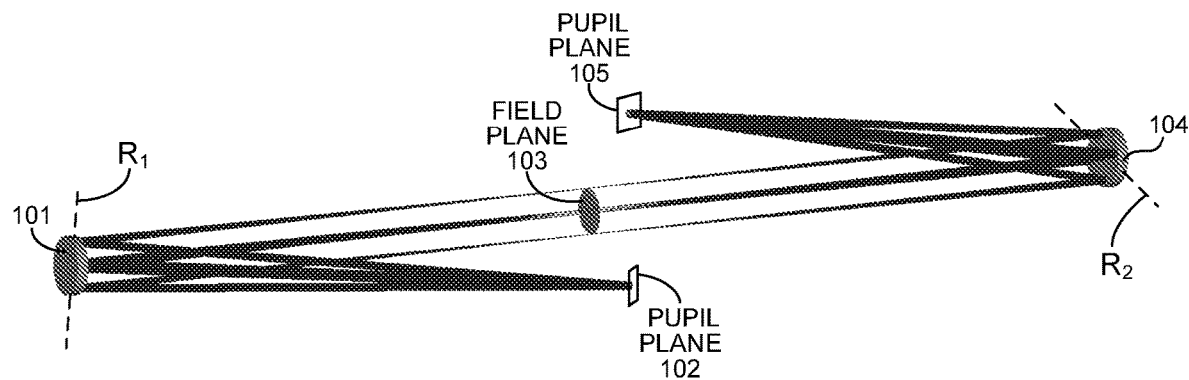
FIG. 7 is a diagram illustrative of a second concave, spherical mirror disposed in a cascade arrangement with the concave, spherical mirror depicted in FIG. 1 to form a two-mirror relay.

FIG. 7 illustrates a second concave, spherical mirror 104 disposed in a cascade arrangement with concave, spherical mirror 101. In the cascade arrangement, the image field plane of the first mirror is the object field plane of the second mirror. The object field plane of concave, spherical mirror 104 is aligned with the image field plane 103 of concave, spherical mirror 101. Pupil plane 105 associated with concave, spherical mirror 104 is also illustrated. The pupil plane 105 and the image field plane of mirror 104 are each located one focal length from mirror 104. In this manner, mirrors 101 and 104 form a reflective pupil relay system where the entrance pupil for mirror 101 is located one focal length before the pupil relay system and the exit pupil for mirror 104 is located one focal length after the pupil relay system.

Wavefronts in the pupil plane 105 of mirror 104 are collimated and wavefronts in the field plane 103 of mirror 101 and mirror 104 are telecentric. Mirror 104 is tilted about a tilt axis, R2, so that its local pupil and field planes are physically separated. In this manner, wavefronts propagating through pupil plane 105 and field plane 103 do not interfere.

In the embodiment depicted in FIG. 7, the axis of tilt, $R_1$, of mirror 101 is orthogonal to the axis of tilt, $R_2$, of mirror 104. When the mirror tilt axes, $R_1$ and $R_2$, are oriented orthogonal to one another, the astigmatism introduced by the first mirror is corrected by the astigmatism introduced by the second mirror at the center of the field of view.

Figure 8A:
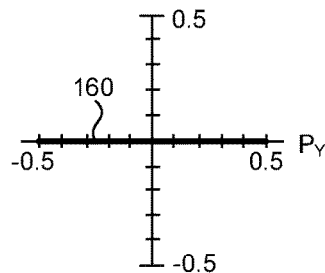
FIGS. 8A-8B depict wavefront aberrations induced by the two-mirror relay of FIG. 7 at the center of the image field in two orthogonal directions.
Figure 8B:
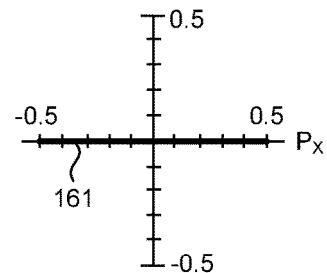
Figure 9A:
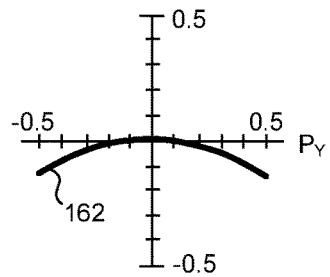
FIGS. 9A-9B depict wavefront aberrations induced by the two-mirror relay of FIG. 7 at a corner of the image field in two orthogonal directions.
Figure 9B:
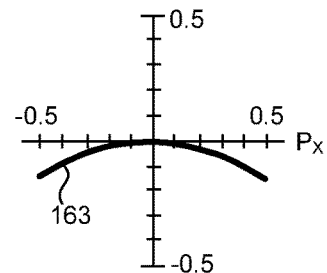
Figure 10A:
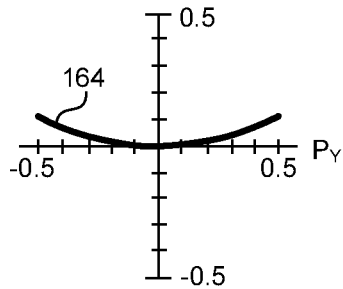
FIGS. 10A-10B depict wavefront aberrations induced by the two-mirror relay of FIG. 7 at another corner of the image field in two orthogonal directions.
Figure 10B:
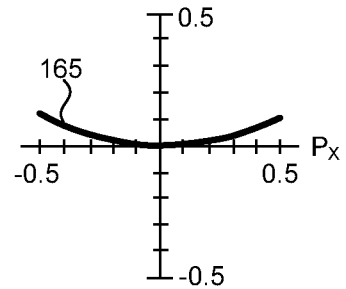
Figure 11A:
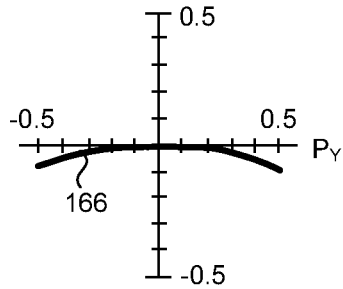
FIGS. 11A-11B depict wavefront aberrations induced by the two-mirror relay of FIG. 7 at yet another corner of the image field in two orthogonal directions.
Figure 11B:
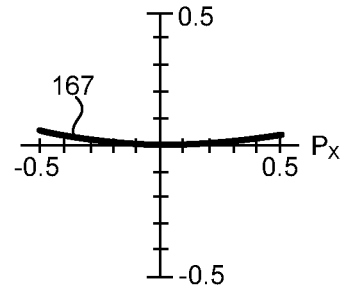
Figure 12A:
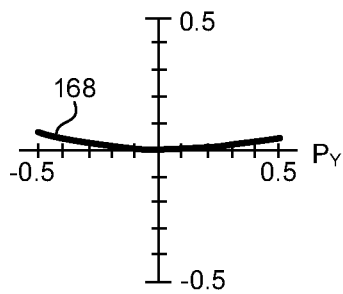
FIGS. 12A-12B depict wavefront aberrations induced by the two-mirror relay of FIG. 7 at yet another corner of the image field in two orthogonal directions.
Figure 12B:
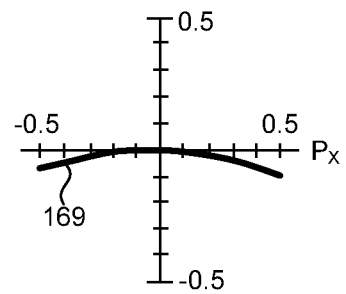

FIGS. 8A-12B depict wavefront aberrations induced by the cascade arrangement of mirrors 101 and 104 depicted in FIG. 7. FIG. 8A depicts the optical path difference 160 from the pupil plane 102 to the pupil plane 105 at a range of displacements in the y-direction (i.e., $P_Y$) from the center of the image field (i.e., {X,Y}={0.0,0.0} located in pupil plane 105. FIG. 8B depicts the optical path difference 161 from the pupil plane 102 to the pupil plane 105 at a range of displacements in the x-direction (i.e., $P_X$) from the center of the image field (i.e., {X,Y}={0.0,0.0} located in pupil plane 105. FIGS. 9A-9B depict the optical path differences 162 and 163 from the pupil plane 102 to the pupil plane 105 at a range of displacements in the y-direction and the x-direction, respectively, from a corner of the image field (i.e., {X,Y}={0.050,−0.050} located in pupil plane 105. FIGS. 10A-10B depict the optical path differences 164 and 165 from the pupil plane 102 to the pupil plane 105 at a range of displacements in the y-direction and the x-direction, respectively, from another corner of the image field (i.e., {X,Y}={−0.050,0.050} located in pupil plane 105. FIGS. 11A-11B depict the optical path differences 166 and 167 from the pupil plane 102 to the pupil plane 105 at a range of displacements in the y-direction and the x-direction, respectively, from yet another corner of the image field (i.e., {X,Y}={0.050,0.050} located in pupil plane 105. FIGS. 12A-12B depict the optical path differences 168 and 169 from the pupil plane 102 to the pupil plane 105 at a range of displacements in the y-direction and the x-direction, respectively, from yet another corner of the image field (i.e., {X,Y}={−0.050,−0.050} located in pupil plane 105.

As depicted in FIGS. 8-12, the cascade arrangement of two concave, spherical mirrors forms an afocal pupil relay system that corrects for astigmatism at the center of the image field, but does not provide a well-corrected image over the entire field of view.

Figure 13:
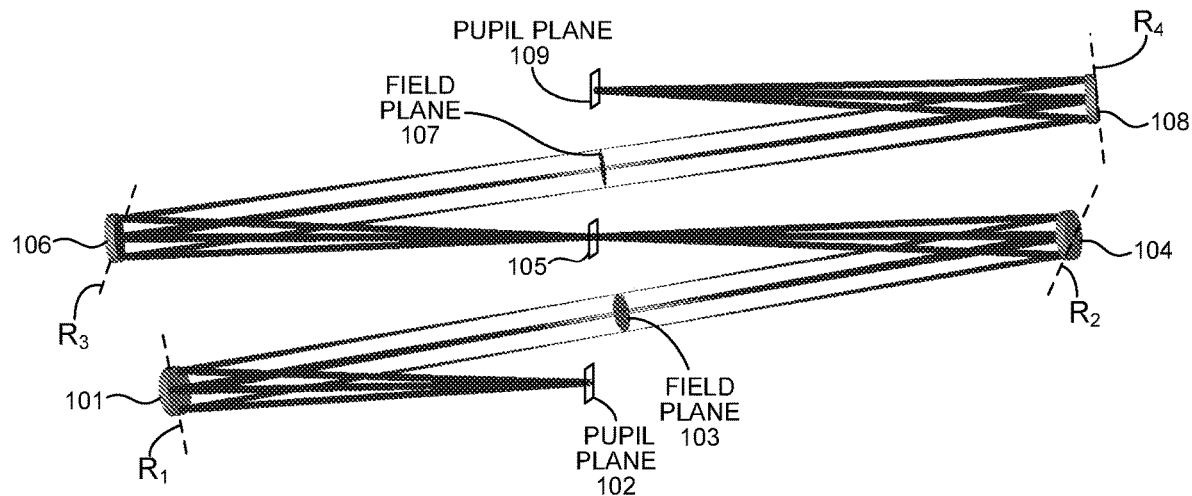
FIG. 13 is a diagram illustrative of a second two-mirror relay disposed in a cascade arrangement with the two-mirror relay depicted in FIG. 7 to form a four-mirror relay in one embodiment.

FIG. 13 illustrates a second reflective pupil relay system including mirrors 106 and 108 disposed in a cascade arrangement with the reflective pupil relay system depicted in FIG. 7. As depicted in FIG. 13, the exit pupil (i.e., image pupil) in pupil plane 105 imaged by the first relay (i.e., cascaded mirrors 101 and 104) is the entrance pupil (i.e., object pupil) of the second relay (i.e., cascaded mirrors 106 and 108). The pupil plane 109 and the field plane of mirror 108 are each located one focal length from mirror 108. Similarly, the pupil plane 105 and the image field plane of mirror 106 are each located one focal length from mirror 106. In this manner, mirrors 101, 104, 106, and 108 form a reflective pupil relay system where the entrance pupil for mirror 101 is located one focal length before the pupil relay system and the exit pupil for mirror 108 is located one focal length after the pupil relay system.

In the cascade arrangement, the image field plane 107 of the third mirror 106 becomes the object field plane of the fourth mirror 108. The object field plane of concave, spherical mirror 108 is aligned with the image field plane 107 of concave, spherical mirror 106. Pupil plane 109 associated with concave, spherical mirror 108 is also illustrated. Wavefronts in the pupil plane 109 of mirror 108 are collimated and wavefronts in the field plane 107 of mirror 106 and mirror 108 are telecentric.

Mirror 106 is tilted about a tilt axis, R3, so that its local pupil and field planes are physically separated. Similarly, mirror 108 is tilted about a tilt axis, R4, so that its local pupil and field planes are physically separated. In this manner, wavefronts propagating through the pupil relay system depicted in FIG. 13 do not interfere.

In the embodiment depicted in FIG. 13, the second pupil relay is rotated about the common optical axis of the two relays so that it is orthogonal to the first pupil relay. In this manner, the tilt axes, $R_1$ and $R_4$, associated with the first (i.e., mirror 101) and fourth (i.e., mirror 108) mirrors, respectively, are parallel and the tilt axes, $R_2$ and $R_3$, associated with the second (i.e., mirror 104) and third (i.e., mirror 106) mirrors are parallel. Moreover, the tilt axes, $R_1$ and $R_4$, are orthogonal to the tilt axes, $R_2$ and $R_3$.

Figure 14A:
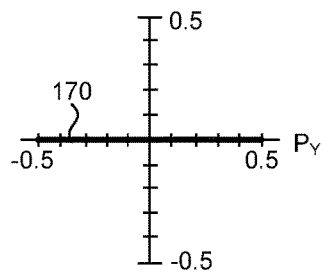
FIGS. 14A-14B depict wavefront aberrations induced by the four-mirror relay of FIG. 13 at the center of the image field in two orthogonal directions.
Figure 14B:
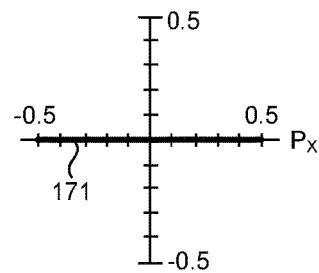
Figure 15A:
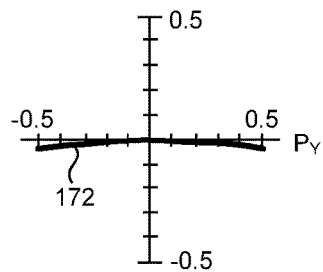
FIGS. 15A-15B depict wavefront aberrations induced by the four-mirror relay of FIG. 13 at a corner of the image field in two orthogonal directions.
Figure 15B:
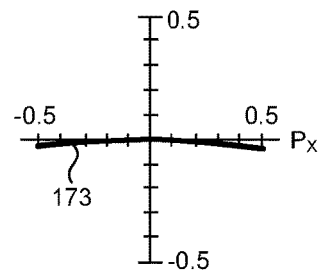
Figure 16A:
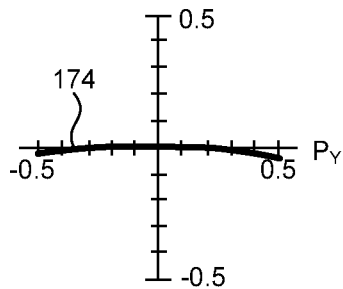
FIGS. 16A-16B depict wavefront aberrations induced by the four-mirror relay of FIG. 13 at another corner of the image field in two orthogonal directions.
Figure 16B:
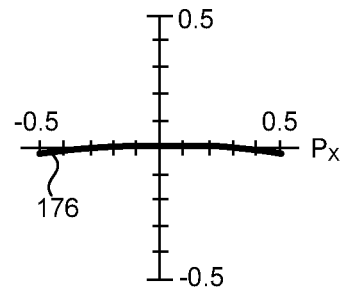
Figure 17A:
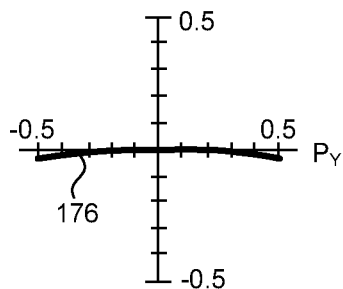
FIGS. 17A-17B depict wavefront aberrations induced by the four-mirror relay of FIG. 13 at yet another corner of the image field in two orthogonal directions.
Figure 17B:
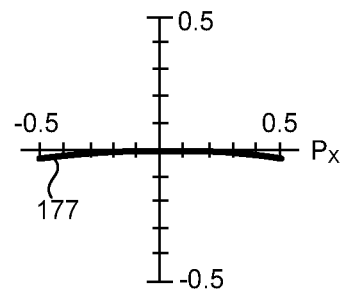
Figure 18A:
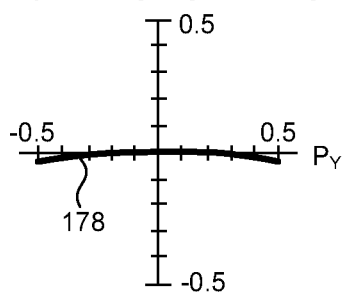
FIGS. 18A-18B depict wavefront aberrations induced by the four-mirror relay of FIG. 13 at yet another corner of the image field in two orthogonal directions.
Figure 18B:
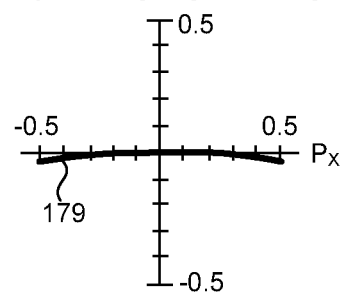

FIGS. 14A-18B depict wavefront aberrations induced by the cascade arrangement of mirrors 101, 104, 106, and 108 depicted in FIG. 13. FIG. 14A depicts the optical path difference 170 from the pupil plane 102 to the pupil plane 109 at a range of displacements in the y-direction (i.e., $P_Y$) from the center of the image field (i.e., {X,Y}={0.0,0.0} located in pupil plane 109. FIG. 14B depicts the optical path difference 171 from the pupil plane 102 to the pupil plane 109 at a range of displacements in the x-direction (i.e., $P_X$) from the center of the image field (i.e., {X,Y}={0.0,0.0} located in pupil plane 109. FIGS. 15A-15B depict the optical path differences 172 and 173 from the pupil plane 102 to the pupil plane 109 at a range of displacements in the y-direction and the x-direction, respectively, from a corner of the image field (i.e., {X,Y}={0.050,-0.050} located in pupil plane 109. FIGS. 16A-16B depict the optical path differences 174 and 175 from the pupil plane 102 to the pupil plane 109 at a range of displacements in the y-direction and the x-direction, respectively, from another corner of the image field (i.e., {X,Y}={-0.050,0.050} located in pupil plane 109. FIGS. 11A-11B depict the optical path differences 176 and 177 from the pupil plane 102 to the pupil plane 109 at a range of displacements in the y-direction and the x-direction, respectively, from yet another corner of the image field (i.e., {X,Y}={0.050,0.050} located in pupil plane 109. FIGS. 17A-17B depict the optical path differences 178 and 179 from the pupil plane 102 to the pupil plane 109 at a range of displacements in the y-direction and the x-direction, respectively, from yet another corner of the image field (i.e., {X,Y}={-0.050,-0.050} located in pupil plane 109.

As depicted in FIGS. 14-18, the cascade arrangement of four concave, tilted spherical mirrors forms an afocal pupil relay system that corrects for astigmatism at the center of the image field. In addition, the cascade arrangement of four concave, tilted, spherical mirrors corrects the residual astigmatism across the field of view in the first, two-mirror pupil relay with the residual astigmatism across the field of view in the second, two-mirror pupil relay. The result is a four-mirror, afocal pupil relay system which generates well-corrected images across its entire field of view.

In the embodiment depicted in FIG. 13, the tilt axes of the two mirrors in each half of the four mirror pupil relay system are rotated so that astigmatism is corrected in the wavefront at the center of the field of view at the intermediate pupil plane (i.e., intermediate pupil plane 105).

Figure 19:
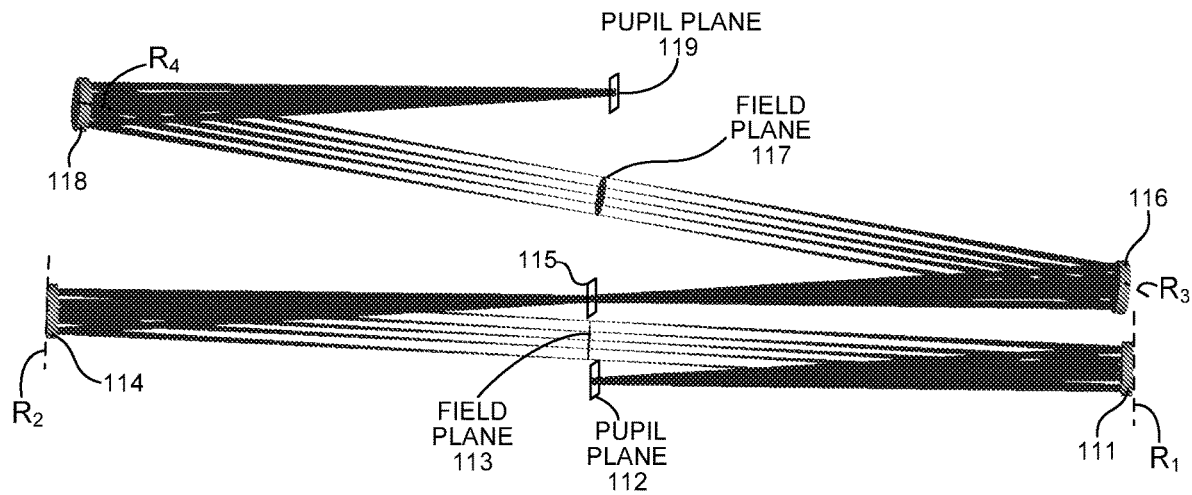
FIG. 19 is a diagram illustrative of a second two-mirror relay disposed in a cascade arrangement with the two-mirror relay depicted in FIG. 7 to form a four-mirror relay in another embodiment.

In another embodiment, depicted in FIG. 19, the two mirrors in each half of the four mirror pupil relay system are tilted along parallel axes of rotation. However, the two halves of the four mirror pupil relay system are rotated with respect to each other about their common optical axis so that they are orthogonal. In this embodiment, astigmatism is not corrected at the center of the field of view at the intermediate pupil, but it is corrected over the full field of view in the full system.

FIG. 19 illustrates a four mirror pupil relay system including mirrors 111, 114, 116, and 118 in a cascade arrangement. As depicted in FIG. 13 the entrance pupil for mirror 111 is located one focal length before the pupil relay system and the exit pupil for mirror 119 is located one focal length after the pupil relay system.

In the embodiment, depicted in FIG. 19, mirror 111 is tilted about a tilt axis, R1, mirror 114 is tilted about a tilt axis, R2, mirror 116 is tilted about a tilt axis, R3, and mirror 118 is tilted about a tilt axis, R4. In this manner, the local pupil and field planes associated with each mirror are physically separated such that wavefronts propagating through the pupil relay system depicted in FIG. 19 do not interfere.

In the embodiment depicted in FIG. 19, the tilt axes, $R_1$ and $R_2$, associated with the first (i.e., mirror 111) and second (i.e., mirror 114) mirrors, respectively, are parallel. Similarly, the tilt axes, $R_3$ and $R_4$, associated with the third (i.e., mirror 116) and fourth (i.e., mirror 118) mirrors, respectively, are parallel. However, the pupil relay associated with mirrors 116 and 118 is rotated about the common optical axis of the two relays so that it is orthogonal to the first pupil relay associated with mirrors 111 and 114. In this manner, the tilt axes, $R_1$ and $R_2$, associated with the first and second mirrors are both orthogonal to the tilt axes, $R_3$ and $R_4$.

Figure 20A:
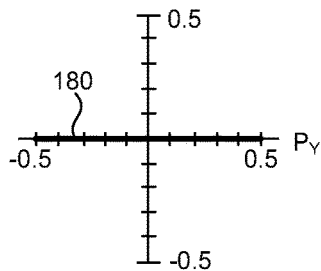
FIGS. 20A-20B depict wavefront aberrations induced by the four-mirror relay of FIG. 19 at the center of the image field in two orthogonal directions.
Figure 20B:
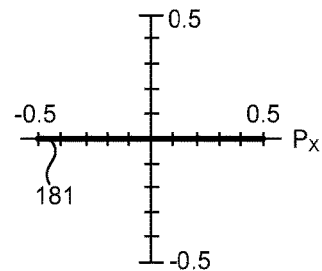
Figure 21A:
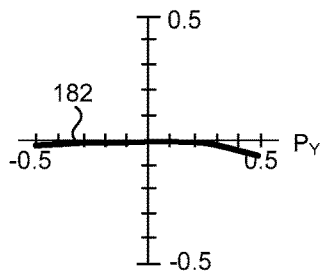
FIGS. 21A-21B depict wavefront aberrations induced by the four-mirror relay of FIG. 19 at a corner of the image field in two orthogonal directions.
Figure 21B:
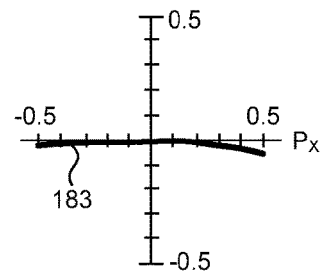
Figure 22A:
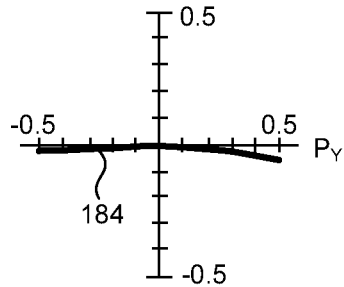
FIGS. 22A-22B depict wavefront aberrations induced by the four-mirror relay of FIG. 19 at another corner of the image field in two orthogonal directions.
Figure 22B:
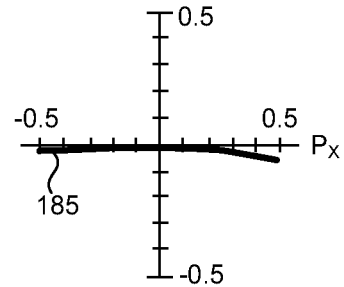
Figure 23A:
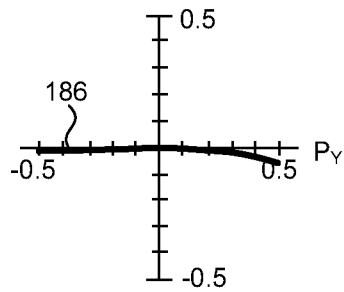
FIGS. 23A-23B depict wavefront aberrations induced by the four-mirror relay of FIG. 19 at yet another corner of the image field in two orthogonal directions.
Figure 23B:
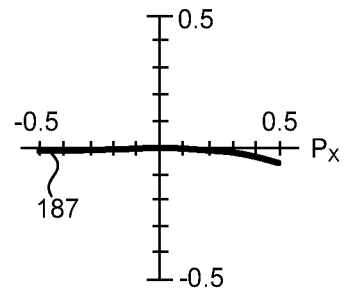
Figure 24A:
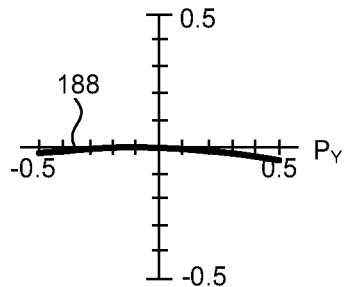
FIGS. 24A-24B depict wavefront aberrations induced by the four-mirror relay of FIG. 19 at yet another corner of the image field in two orthogonal directions.
Figure 24B:
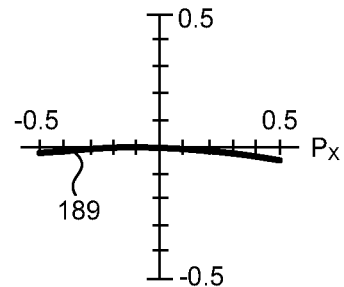

FIGS. 20A-24B depict wavefront aberrations induced by the cascade arrangement of mirrors 111, 114, 116, and 118 depicted in FIG. 19. FIG. 20A depicts the optical path difference 180 from the pupil plane 112 to the pupil plane 119 at a range of displacements in the y-direction (i.e., $P_Y$) from the center of the image field (i.e., {X,Y}={0.0,0.0} located in pupil plane 119. FIG. 20B depicts the optical path difference 181 from the pupil plane 112 to the pupil plane 119 at a range of displacements in the x-direction (i.e., $P_X$) from the center of the image field (i.e., {X,Y}={0.0,0.0} located in pupil plane 119. FIGS. 21A-21B depict the optical path differences 182 and 183 from the pupil plane 112 to the pupil plane 119 at a range of displacements in the y-direction and the x-direction, respectively, from a corner of the image field (i.e., {X,Y}={0.050,-0.050} located in pupil plane 119. FIGS. 22A-22B depict the optical path differences 184 and 185 from the pupil plane 112 to the pupil plane 119 at a range of displacements in the y-direction and the x-direction, respectively, from another corner of the image field (i.e., {X,Y}={-0.050,0.050} located in pupil plane 119. FIGS. 23A-23B depict the optical path differences 186 and 187 from the pupil plane 112 to the pupil plane 119 at a range of displacements in the y-direction and the x-direction, respectively, from yet another corner of the image field (i.e., {X,Y}={0.050,0.050} located in pupil plane 119. FIGS. 24A-24B depict the optical path differences 188 and 189 from the pupil plane 112 to the pupil plane 119 at a range of displacements in the y-direction and the x-direction, respectively, from yet another corner of the image field (i.e., {X,Y}={-0.050,-0.050} located in pupil plane 119.

As depicted in FIGS. 20-24, the cascade arrangement of four concave, tilted spherical mirrors depicted in FIG. 19 forms an afocal pupil relay system that generates well-corrected images across its entire field of view.

In the embodiments depicted in FIG. 13 and FIG. 19, the focal length of each mirror is the same. In some embodiments, the radius of curvature and tilt angles of all four mirrors in the pupil relay system are the same nominal values (i.e., within manufacturing tolerances). This forms an afocal pupil relay system having 1× magnification. In some other embodiments, an afocal pupil relay system having a magnification other than 1× magnification can be formed by assembling mirrors having one or more different focal lengths in a cascade arrangement as described herein.

Figure 25:
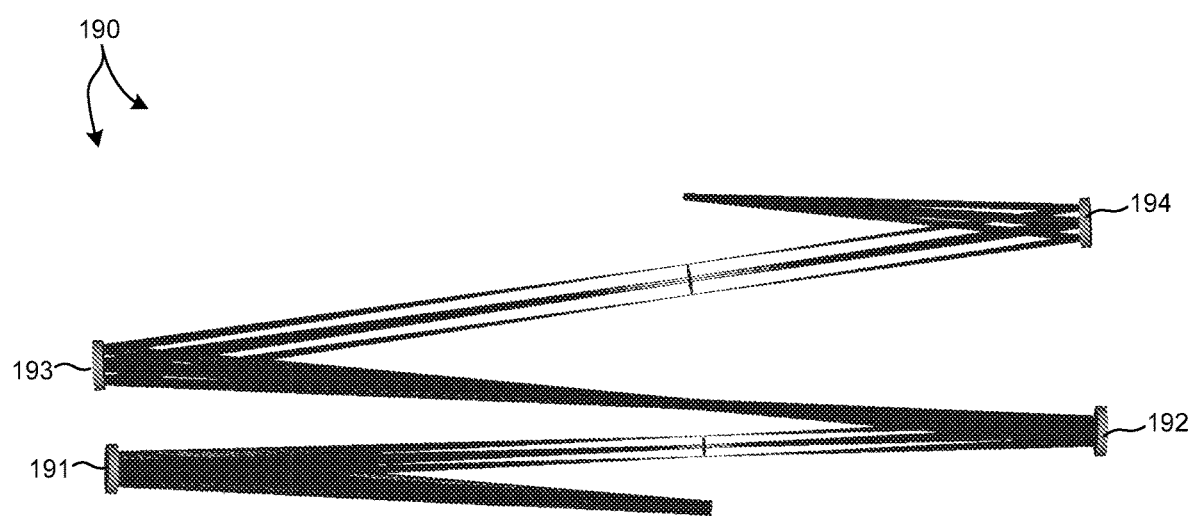
FIG. 25 is a diagram illustrative of a cascade arrangement of four tilted, spherical mirrors having mirrors with different focal lengths.

FIG. 25 depicts a cascade arrangement of four tilted, spherical mirrors 190 similar to that described with reference to FIG. 13. However, as depicted in FIG. 25, mirrors 192 and 194 have a different focal length than the mirrors 191 and 193. If the focal length of the first mirror (i.e., mirror 191) is fA, and the focal length of the second mirror (i.e., mirror 192) is fB, then the pupil magnification in the first half of the system is, fB/fA. When the same configuration is repeated in the second half of the system, the total pupil magnification for the four mirror system is, $(fB/fA)^2$.

In general, off-axis aberrations introduced by the mirrors of the four mirror pupil relay system increase as the tilt angles of the mirrors increase. While the dominant aberration, astigmatism, is compensated in the four mirror system, coma is not compensated. It is desirable to employ mirror tilt angles that are as small as possible (without introducing obscurations) to minimize the introduction of coma. In addition, off-axis aberrations and spherical aberration introduced by the mirrors increase as the focal lengths of the mirrors decrease. Residual aberrations in the pupil relay system can be reduced without changing the overall magnification by increasing the focal lengths of the mirrors. This also increases the beam size on each mirror, which generally reduces sensitivity to surface imperfections and roughness. However, in practice, the size of the overall system limits the focal length of the mirrors. Thus, in general, it is advantageous to employ mirrors having focal lengths as large as practically possible, and minimize tilt angles to improve system performance.

In another further aspect, the pupil relays systems described herein are employed as part of a metrology system. In some embodiments, one or both of the illumination and collection pupil planes of a metrology system are inaccessible. It is often necessary to utilize a pupil relay system to image one or both of the illumination and collection pupils to other locations that are physically accessible where additional optical elements (e.g., apodizers, field stops, apertures, filters, etc.) can be located and additional operations (e.g., beam conditioning, detection, etc.) can take place. In general, one or both of the illumination and collection pupil planes may be imaged to one or more different locations by one or more pupil relay systems.

Figure 26:
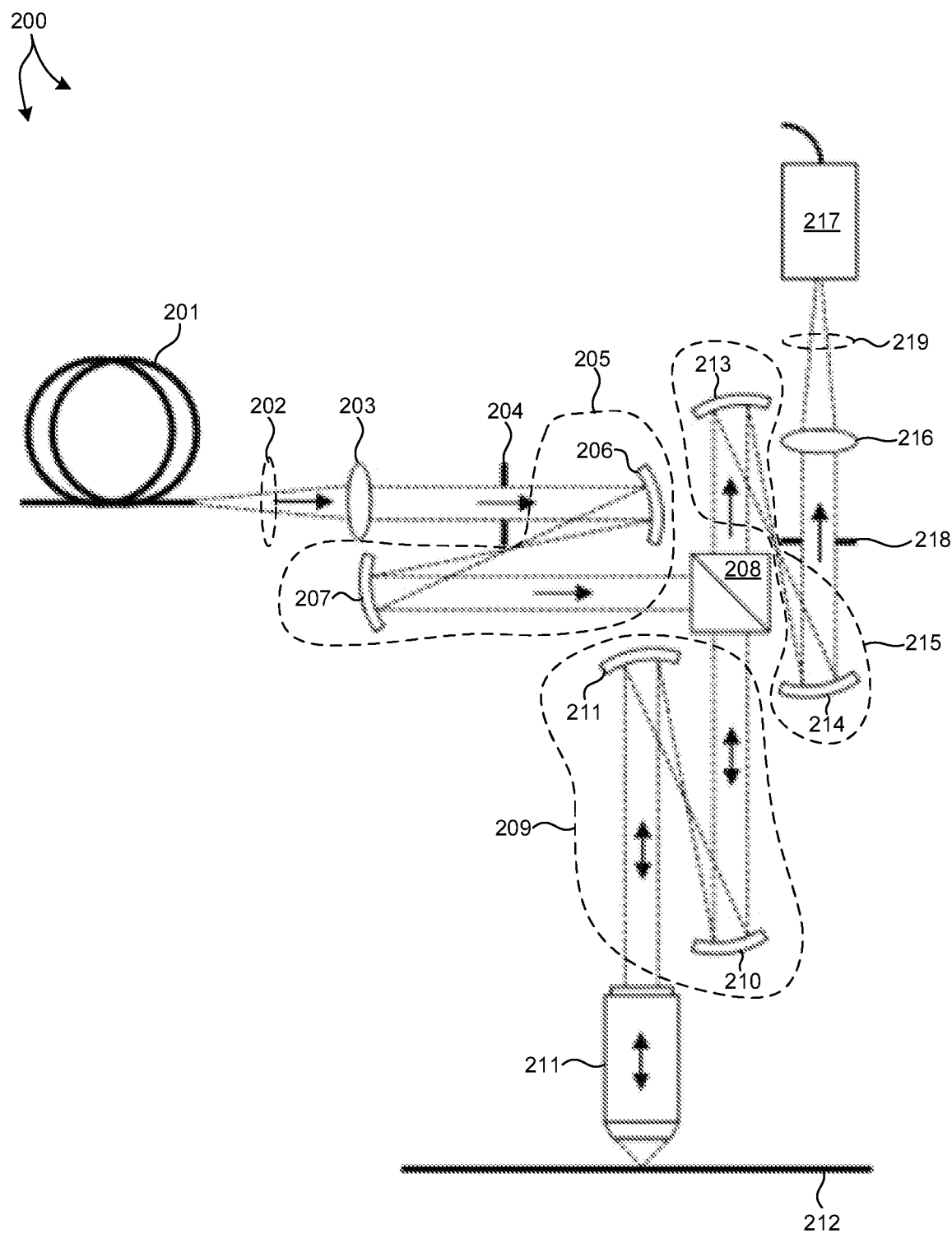
FIG. 26 is a diagram illustrative of a metrology system 200 that includes reflective afocal pupil relay telescopes as described herein on both the illumination and collection portions of the optical path in one embodiment.

FIG. 26 illustrates a metrology system 200 that includes reflective afocal pupil relay telescopes as described herein on both the illumination and collection portions of the optical path. Note that the four mirrors in each afocal pupil relay telescope are illustrated in a common plane for illustration purposes only. In practice, the mirrors must fold the optical path out of a single plane to achieve aberration correction over the entire field of view as described, for example, with reference to FIGS. 13 and 19. Metrology system 200 is configured for epi-illumination (i.e., illumination and collection are both normal to the object surface).

Metrology system 200 includes an illumination source 201 configured to generate an amount of illumination light 202. Illumination light 202 passes through optics 203 configured to collimate the illumination light before passing through illumination aperture 204. Illumination aperture 204 lies at the entrance pupil plane of an illumination pupil relay system that includes a first half 205 and a second half 209.

The illumination pupil relay system is configured as a four mirror, cascaded arrangement of tilted spherical mirrors as described herein, for example, with reference to FIGS. 13 and 19. The illumination pupil relay system images the illumination light at the illumination aperture 204 to an exit pupil plane (not shown) within objective 211. Illumination light 202 passes through illumination aperture 204 and is reflected by cascaded mirrors 206 and 207. A beam splitter 208 is located in the optical path to separate the illumination and collection beams. After passing through beam splitter 208, illumination light 202 is reflected by cascaded mirrors 210 and 211 toward objective 211. Objective 211 focuses the light at the exit pupil plane onto the surface of a specimen 212 under measurement.

An amount of collected light 219 is gathered from specimen 212 by objective 211 at the entrance pupil plane (not shown) of a collection pupil relay system that images the collected light at the entrance pupil plane in objective 211 to an exit pupil plane. The collection pupil relay system is also configured as a four mirror, cascaded arrangement of tilted spherical mirrors as described herein, for example, with reference to FIGS. 13 and 19. The collection pupil relay system includes a first half pupil relay 209 and a second half pupil relay 213. The collected light is reflected by cascaded mirrors 211 and 210. After passing through beam splitter 208, collected light 219 is reflected by cascaded mirrors 213 and 214 toward detector 217

As depicted in FIG. 26, mirrors 211 and 210 are shared by both the illumination and collection pupil relay systems. Beam splitter 208 is placed near the intermediate pupil plane in each of the 4-mirror pupil relay systems. Thus, the half pupil relay 209 is common to both illumination and collection beams. Half pupil relay 205 is associated with the illumination path and half pupil relay 215 is associated with the collection path. This provides separate, physically accessible pupils on the illumination path and on the collection path. After reflection from mirror 215, collected light 219 passes through a collection aperture 218 and optics 216 configured to focus collected light 219 onto a sensor surface of detector 217.

In the embodiment depicted in FIG. 26, the illumination pupil distribution is defined at the accessible illumination pupil plane, and a detector sensor surface is positioned at the collection field plane. In yet another embodiment (not shown), the detector 217 is positioned at collection pupil 218 to record the angular distribution of light scattered by specimen 212. In general, the illumination plane and the collection plane may be a pupil plane or a field plane.

Figure 27:
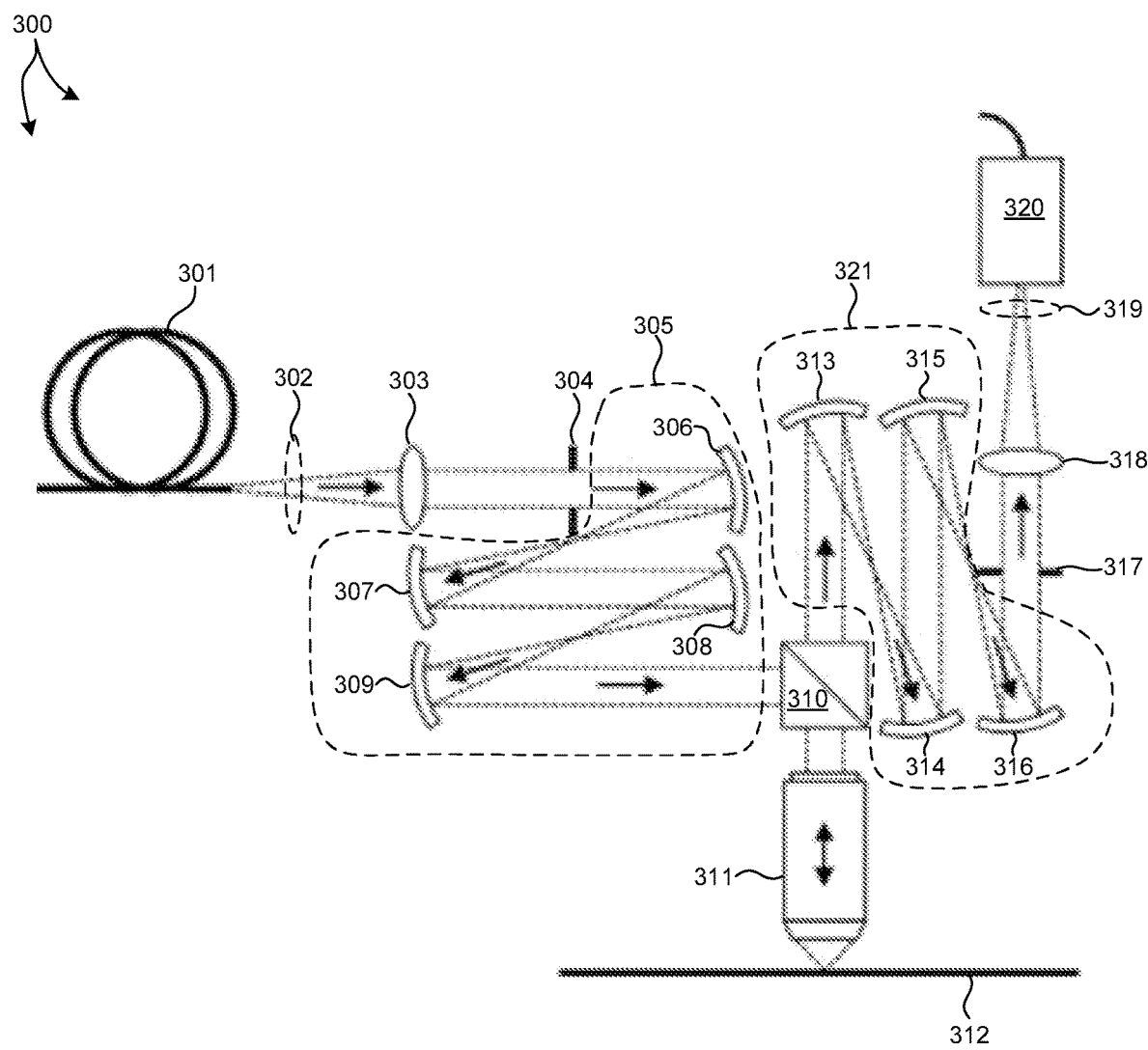
FIG. 27 is a diagram illustrative of a metrology system 300 that includes reflective afocal pupil relay telescopes as described herein on both the illumination and collection portions of the optical path in another embodiment.

FIG. 27 illustrates a metrology system 300 that includes reflective afocal pupil relay telescopes as described herein on both the illumination and collection portions of the optical path in another embodiment. Note that the four mirrors in each afocal pupil relay telescope are illustrated in a common plane for illustration purposes only. In practice, the mirrors must fold the optical path out of a single plane to achieve aberration correction over the entire field of view as described, for example, with reference to FIGS. 13 and 19. Metrology system 300 is also configured for epi-illumination (i.e., illumination and collection are both normal to the object surface).

Metrology system 300 includes an illumination source 301 configured to generate an amount of illumination light 302. Illumination light 302 passes through optics 303 configured to collimate the illumination light before passing through illumination aperture 304. Illumination aperture 304 lies at the entrance pupil plane of an illumination pupil relay system 305 configured as a four mirror, cascaded arrangement of tilted spherical mirrors as described herein, for example, with reference to FIGS. 13 and 19. The illumination pupil relay system 305 images the illumination light at the illumination aperture 304 to an exit pupil plane (not shown) within objective 311. Illumination light 302 passes through illumination aperture 304 and is reflected by cascaded mirrors 306, 307, 308, and 309 to beam splitter 310. Beam splitter 310 is located in the optical path to separate the illumination and collection beams. After passing through beam splitter 310, illumination light 302 is directed toward objective 311. Objective 311 focuses the light at the exit pupil plane onto the surface of a specimen 312 under measurement.

An amount of collected light 319 is gathered from specimen 312 by objective 311 at the entrance pupil plane (not shown) of a collection pupil relay system 321 that images the collected light at the entrance pupil plane in objective 311 to an exit pupil plane. The collection pupil relay system 321 is also configured as a four mirror, cascaded arrangement of tilted spherical mirrors as described herein, for example, with reference to FIGS. 13 and 19. After passing through beam splitter 310, collected light 319 is reflected by cascaded mirrors 313, 314, 315, and 316 toward detector 320. After reflection from mirror 316, collected light 319 passes through a collection aperture 317 and optics 318 configured to focus collected light 319 onto a sensor surface of detector 320.

As depicted in FIG. 27, pupil relay systems 305 and 321 are separate pupil relay systems configured to provide separate, physically accessible pupils on the illumination path and on the collection path, respectively. In the embodiment depicted in FIG. 27, the illumination pupil distribution is defined at the accessible illumination pupil plane, and a detector sensor surface is positioned at the collection field plane. In yet another embodiment (not shown), system 300 is configured with detector 320 positioned at collection pupil 317 to record the angular distribution of light scattered by specimen 312. In general, the illumination plane and the collection plane may be a pupil plane or a field plane.

Figure 28:
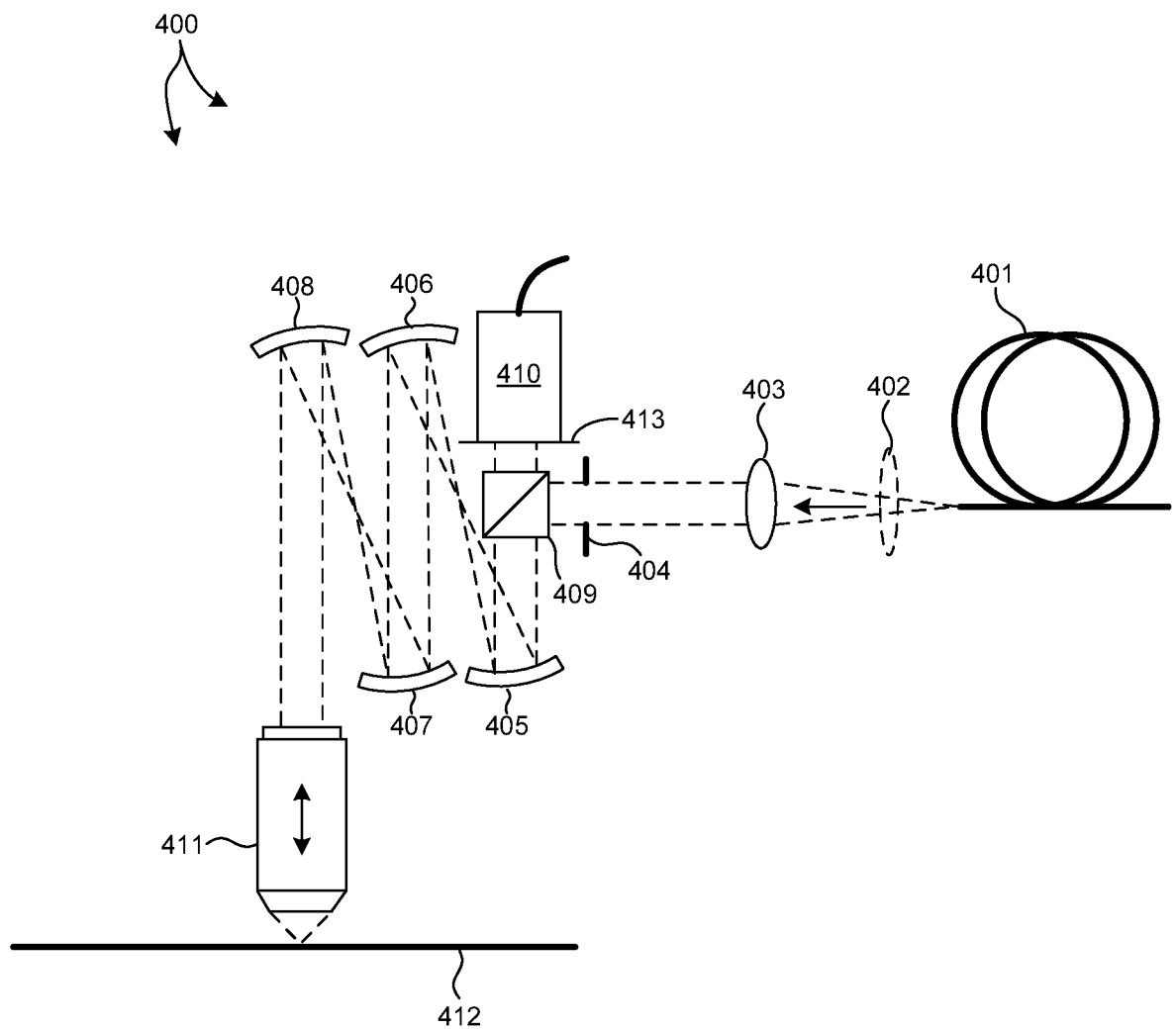
FIG. 28 is a diagram illustrative of a metrology system 400 that includes a reflective afocal pupil relay telescope as described herein in both the illumination and collection portions of the optical path in yet another embodiment.

FIG. 28 illustrates a metrology system 400 that includes a reflective afocal pupil relay telescope as described herein shared by both the illumination and collection portions of the optical path in yet another embodiment. Note that the four mirrors of the afocal pupil relay telescope are illustrated in a common plane for illustration purposes only. In practice, the mirrors must fold the optical path out of a single plane to achieve aberration correction over the entire field of view as described, for example, with reference to FIGS. 13 and 19. Metrology system 400 is also configured for epi-illumination (i.e., illumination and collection are both normal to the object surface).

Metrology system 400 includes an illumination source 401 configured to generate an amount of illumination light 402. Illumination light 402 passes through optics 403 configured to collimate the illumination light before passing through illumination aperture 404. Illumination aperture 404 lies at the entrance pupil plane of an illumination pupil relay system configured as a four mirror, cascaded arrangement of tilted spherical mirrors as described herein, for example, with reference to FIGS. 13 and 19. The illumination pupil relay system images the illumination light at the illumination aperture 404 to an exit pupil plane (not shown) within objective 411. Illumination light 402 passes through beam splitter 409 and is reflected by cascaded mirrors 405, 406, 407, and 408 to objective 411. Beam splitter 409 is located in the optical path between mirror 405 and the accessible illumination and collection pupils. Beam splitter 409 is configured to separate the illumination and collection beams. After passing through beam splitter 409, illumination light 402 is directed toward objective 411. Objective 411 focuses the light at the exit pupil plane onto the surface of a specimen 412 under measurement.

An amount of collected light is gathered from specimen 412 by objective 411 at the entrance pupil plane (not shown) of a collection pupil relay system that images the collected light at the entrance pupil plane in objective 411 to an exit pupil plane 413. In this embodiment, the collection pupil relay system includes the same four mirror, cascaded arrangement of tilted spherical mirrors as the illumination pupil relay system. The collected light is reflected by cascaded mirrors 408, 407, 406, and 405 toward beam splitter 409. After passing through beam splitter 409, the collected light reaches collection pupil plane 413 where a sensor surface of detector 410 is located.

As depicted in FIG. 28, the illumination and collection pupil relay systems are both the same cascaded arrangement of tilted spherical mirrors. Each pupil relay system is configured to provide separate, physically accessible pupils on the illumination path and on the collection path, respectively. In the embodiment depicted in FIG. 28, the illumination pupil distribution is defined at the accessible illumination pupil plane where aperture 404 is located, and a detector sensor surface is positioned at the collection pupil to record the angular distribution of light scattered by specimen 412. In yet another embodiment (not shown), system 400 is configured with detector 410 positioned at the collection field plane similar to the embodiments depicted in FIGS. 26 and 27.

Although the use of a four mirror pupil relay system is described with reference to epi-illumination systems 200, 300, and 400, in general, any optical system which utilizes an afocal pupil relay telescope may benefit from employing the four mirror pupil relay systems described herein. For example, the four mirror pupil relay systems described herein may be employed in the illumination and collection arms of microscopes utilized for photomask defect inspection and metrology, unpatterned wafer defect inspection and patterned wafer defect inspection and metrology, including CD and overlay metrology.

In the field of semiconductor metrology, a metrology tool may comprise an illumination system which illuminates a target, a collection system which captures relevant information provided by the interaction (or lack thereof) of the illumination system with a target, device or feature, and a processing system which analyzes the information collected using one or more algorithms. Metrology tools can be used to measure structural and material characteristics (e.g., material composition, dimensional characteristics of structures and films such as film thickness and/or critical dimensions of structures, overlay, etc.) associated with various semiconductor fabrication processes. These measurements are used to facilitate process controls, determine yield efficiencies, and provide insight into process capability in the manufacture of semiconductor dies.

In some embodiments, a metrology tool includes one or more pupil relay systems as described herein as part of one or more hardware configurations which may be used to measure various specimens. By way of non-limiting example, such hardware configurations include a spectroscopic ellipsometer (SE), SE with multiple angles of illumination, SE measuring Mueller matrix elements (e.g., using rotating compensator(s)), single-wavelength ellipsometer, an angle-resolved ellipsometer such as a beam profile ellipsometer, an angle-resolved reflectometer such as a beam profile reflectometer, a broadband reflective spectrometer, a single-wavelength reflectometer, an image based metrology system, and a scatterometer (e.g., speckle analyzer).

The hardware configurations can be separated into discrete operational systems. On the other hand, one or more hardware configurations can be combined into a single tool. One example of such a combination of multiple hardware configurations into a single tool is described in U.S. Pat. No. 7,933,026, issued on Apr. 26, 2011, and assigned to KLA-Tencor Corp., the entirety of which is incorporated herein by reference.

In some examples, multiple metrology techniques may be employed to measure one or more metrology targets. Techniques for a combined analysis of measurement results derived from multiple metrology techniques is described in U.S. Pat. No. 7,478,019, issued on Jan. 13, 2009, and assigned to KLA-Tencor Corp., the entirety of which is incorporated herein by reference.

The illumination system of the aforementioned hardware configurations includes one or more light sources. The light source may generate light having only one wavelength (i.e., monochromatic light), light having a number of discrete wavelengths (i.e., polychromatic light), light having multiple wavelengths (i.e., broadband light) and/or light the sweeps through wavelengths, either continuously or hopping between wavelengths (i.e., tunable sources or swept source). Examples of suitable light sources include a white light source, an ultraviolet (UV) laser, an arc lamp or an electrode-less lamp, a laser sustained plasma (LSP) source, for example those commercially available from Energetiq Technology, Inc., Woburn, Mass., a supercontinuum source such as those commercially available from NKT Photonics Inc., Morganville, N.J., or shorter-wavelength sources such as x-ray sources, extreme UV sources, or some combination thereof. The light source may also be configured to provide light having sufficient brightness. The metrology system may also include feedback to the light source to stabilize its power and wavelength. The output of the light source may be delivered via free-space propagation, or, in some embodiments, delivered via optical fiber or a light guide of any type.

A metrology tool employing one or more pupil relay systems as described herein may be configured to make many different types of measurements related to semiconductor manufacturing. For example, the metrology tool may be configured to measure characteristics of one or more targets, such as critical dimensions, overlay, sidewall angles, film thicknesses, shape, stress, material composition, bandgap, electrical properties, process-related parameters (e.g., focus and/or dose), etc. The targets may include certain regions of interest that are periodic in nature, such as gratings in a memory die. Targets may include multiple layers (or films) whose thicknesses can be measured by the metrology tool. Targets may include target designs placed (or already existing) on the semiconductor wafer for use in alignment and/or overlay registration operations. Targets may be located within the scribe lines (e.g., between dies) and/or located in the die itself. In certain embodiments, multiple targets are measured (at the same time or at differing times) by the same or multiple metrology tools as described in U.S. Pat. No. 7,478,019. The data from such measurements may be combined. Data from the metrology tool is used in a semiconductor manufacturing process, for example, to feed-forward, feed-backward and/or feed-sideways corrections to the process (e.g. lithography, etch).

As semiconductor device pattern dimensions continue to shrink, smaller metrology targets are often required. Furthermore, the measurement accuracy and matching to actual device characteristics increase the need for device-like targets as well as in-die and even on-device measurements. Various metrology implementations have been proposed to achieve that goal. For example, focused beam ellipsometry based on primarily reflective optics is described in U.S. Pat. No. 5,608,526, issued on Mar. 4, 1997, and assigned to KLA-Tencor Corp., the entirety of which is incorporated herein by reference. Apodizers can be used to mitigate the effects of optical diffraction that cause the spread of the illumination spot to exceed the size defined by geometric optics. The use of apodizers is described in U.S. Pat. No. 5,859,424, issued on Jan. 12, 1999, and assigned to KLA-Tencor Corp., the entirety of which is incorporated herein by reference. The use of high-numerical-aperture systems with simultaneous multiple angle-of-incidence illumination is another way to achieve small-target capability. This technique is described in U.S. Pat. No. 6,429,943, issued on Aug. 6, 2002, and assigned to KLA-Tencor Corp., the entirety of which is incorporated herein by reference.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including critical dimension applications and overlay metrology applications. However, such terms of art do not limit the scope of the term "metrology system" as described herein. In addition, the metrology system 100 may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the calibration of system parameters based on critical dimension data.

Various embodiments are described herein for a semiconductor processing system (e.g., an inspection system or a lithography system) that may be used for processing a specimen. The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, XRF disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An optical relay system comprising:
    four concave mirrors disposed in a cascade arrangement, each concave mirror oriented such that light imaged onto a local field plane and light imaged onto a local pupil plane of each mirror are physically separated by a tilt angle about a tilt axis fixed to each mirror, wherein the tilt angle associated with each mirror is an angle between a vector normal to the local pupil plane and a vector normal to the local field plane associated with each mirror, wherein the tilt axis associated with each mirror is an axis parallel to the local pupil plane and the local field plane associated with each mirror, wherein a tilt axis of a first mirror of the cascade arrangement is orthogonal to a tilt axis of a third mirror of the cascade arrangement.

2. The optical relay system of claim 1, wherein an entrance pupil of the optical relay system is displaced from a first of the four concave mirrors by a focal length of the first mirror, and wherein an exit pupil of the optical relay system is displaced from a fourth of the four concave mirrors by a focal length of the fourth mirror.

3. The optical relay system of claim 1, wherein a reflective surface of each of the four concave mirrors is spherically shaped.

4. The optical relay system of claim 3, wherein a radius of curvature of each of the four concave mirrors is the same nominal value.

5. The optical relay system of claim 4, wherein each tilt angle associated with each of the four concave mirrors is the same value.

6. The optical relay system of claim 1, wherein a tilt axis of a second mirror of the cascade arrangement is parallel to the tilt axis of the first mirror, and wherein a tilt axis of a fourth mirror of the cascade arrangement is parallel to the tilt axis of the third mirror.

7. The optical relay system of claim 1, wherein a tilt axis of a second mirror of the cascade arrangement is orthogonal to the tilt axis of the first mirror, and wherein a tilt axis of a fourth mirror of the cascade arrangement is orthogonal to the tilt axis of the third mirror.

8. A metrology system comprising:
    an illumination source configured to generate an amount of radiation directed to a specimen;
    a detector configured to receive an amount of radiation scattered from the specimen in response to the radiation and generate signals indicative of a property of the specimen; and
    a first optical relay system configured to relay the amount of radiation scattered from the specimen from a collection plane of the metrology system to the detector, wherein the first optical relay system includes:
        a first concave mirror tilted about a first axis fixed to the first concave mirror by a first tilt angle such that wavefronts located in a local field plane and in an entrance pupil plane associated with the first concave mirror are physically separated by the first tilt angle, wherein the first tilt angle is an angle between an incoming beam and an outgoing beam associated with the first concave mirror, wherein the first axis is an axis orthogonal to a plane formed by the incoming and outgoing beams associated with the first concave mirror;
        a second concave mirror tilted about a second axis fixed to the second concave mirror by a second tilt angle such that wavefronts located in a local field plane and in a local pupil plane associated with the second concave mirror are physically separated by the second tilt angle, wherein the local field plane of the second concave mirror is aligned with the local field plane of the first concave mirror, wherein the second tilt angle is an angle between an incoming beam and an outgoing beam associated with the second concave mirror, wherein the second axis is an axis orthogonal to a plane formed by the incoming and outgoing beams associated with the second concave mirror;

a third concave mirror tilted about a third axis fixed to the third concave mirror by a third tilt angle such that wavefronts located in a local field plane and in a local pupil plane associated with the third concave mirror are physically separated by the third tilt angle, wherein the local pupil plane of the third concave mirror is aligned with the local pupil plane of the second concave mirror, wherein the third tilt angle is an angle between an incoming beam and an outgoing beam associated with the third concave mirror, wherein the third axis is an axis orthogonal to a plane formed by the incoming and outgoing beams associated with the third concave mirror; and a fourth concave mirror tilted about a fourth axis fixed to the fourth concave mirror by a fourth tilt angle such that wavefronts located in a local field plane and in an exit pupil plane associated with the fourth concave mirror are physically separated by the fourth tilt angle, wherein the local field plane of the fourth concave mirror is aligned with the local field plane of the third concave mirror, wherein the fourth tilt angle is an angle between an incoming beam and an outgoing beam associated with the fourth concave mirror, wherein the fourth axis is an axis orthogonal to a plane formed by the incoming and outgoing beams associated with the fourth concave mirror.

9. The metrology system of claim 8, wherein the first and third concave mirrors are configured to focus collimated wavefronts and the second and fourth mirrors re-collimate diverging wavefronts reflected from the first and third mirrors, respectively.

10. The metrology system of claim 8, wherein the entrance pupil plane is displaced from the first concave mirror by a focal length of the first concave mirror, and wherein the exit pupil plane is displaced from the fourth concave mirror by a focal length of the fourth concave mirror.

11. The metrology system of claim 8, wherein a reflective surface of each of the first, second, third, and fourth concave mirrors is spherically shaped.

12. The metrology system of claim 11, wherein a radius of curvature of each of the first, second, third, and fourth concave mirrors is the same nominal value.

13. The metrology system of claim 12, wherein each tilt angle associated with each of the first, second, third, and fourth concave mirrors is the same value.

14. The metrology system of claim 8, wherein the first tilt axis is orthogonal to the third tilt axis, the second tilt axis is parallel to first tilt axis, and the fourth tilt axis is parallel to the third tilt axis.

15. The apparatus of claim 8, wherein the first tilt axis is orthogonal to the third tilt axis, the second tilt axis is orthogonal to the first tilt axis, and the fourth tilt axis is orthogonal to the third tilt axis.

16. A metrology system, comprising:
an illumination source configured to generate an amount of radiation directed to a specimen;
a detector configured to receive an amount of radiation scattered from the specimen in response to the radiation and generate signals indicative of a property of the specimen; and
a first optical relay system configured to relay the amount of radiation scattered from the specimen from a collection plane of the metrology system to the detector, wherein the first optical relay system includes four concave, spherical mirrors disposed in a cascade arrangement, each concave, spherical mirror oriented such that light imaged onto a local field plane and light imaged onto a local pupil plane of each mirror are physically separated by a tilt angle about a tilt axis fixed to each mirror, wherein the tilt angle associated with each mirror is an angle between an incoming beam and an outgoing beam associated with each mirror, wherein the tilt axis associated with each mirror is an axis orthogonal to a plane formed by the incoming and outgoing beams associated with each mirror, wherein a tilt axis of a first mirror of the cascade arrangement is orthogonal to a tilt axis of a third mirror of the cascade arrangement.

17. The metrology system of claim 16, further comprising:
a second optical relay system configured to relay the amount of radiation directed to the specimen from the illumination source to an illumination plane of the metrology system, wherein the second optical relay system includes four concave, spherical mirrors disposed in a cascade arrangement, each concave, spherical mirror oriented such that light imaged onto a local field plane and light imaged onto a local pupil plane of each mirror are physically separated by a tilt angle about a tilt axis fixed to each mirror, wherein the tilt angle associated with each mirror is an angle between an incoming beam and an outgoing beam associated with each mirror, wherein the tilt axis associated with each mirror is an axis orthogonal to a plane formed by the incoming and outgoing beams associated with each mirror, wherein a tilt axis of a first mirror of the cascade arrangement is orthogonal to a tilt axis of a third mirror of the cascade arrangement.

18. The metrology system of claim 17, wherein a first and a second of the concave, spherical mirrors of the first optical relay system are the same as a third and a fourth of the concave, spherical mirrors of the second optical relay system, respectively.

19. The metrology system of claim 17, wherein a first, second, third, and fourth of the concave, spherical mirrors of the first optical relay system are the same as a fourth, third, second, and first of the concave, spherical mirrors of the second optical relay system, respectively.

20. The metrology system of claim 16, wherein a tilt axis of a second mirror of the cascade arrangement is parallel to the tilt axis of the first mirror, and wherein a tilt axis of a fourth mirror of the cascade arrangement is parallel to the tilt axis of the third mirror.

21. The metrology system of claim 16, wherein a tilt axis of a second mirror of the cascade arrangement is orthogonal to the tilt axis of the first mirror, and wherein a tilt axis of a fourth mirror of the cascade arrangement is orthogonal to the tilt axis of the third mirror.

22. The metrology system of claim 16, wherein the collection plane is a pupil plane or a field plane.

23. The metrology system of claim 17, wherein the illumination plane is a pupil plane or a field plane.

* * * * *